US005590470A

United States Patent [19]
Erbrick et al.

[11] Patent Number: 5,590,470
[45] Date of Patent: Jan. 7, 1997

[54] CABLE CUTTING TOOL HAVING AN IMPROVED CUTTING BLADE

[75] Inventors: Robert S. Erbrick, Doylestown; Joseph E. Erbrick, Chalfont, both of Pa.

[73] Assignee: Electroline Corp., Pipersville, Pa.

[21] Appl. No.: 393,306

[22] Filed: Feb. 22, 1995

[51] Int. Cl.$^6$ .................................................. B26B 13/06
[52] U.S. Cl. .................................................. 30/250; 30/253
[58] Field of Search ............................ 30/249, 250, 251, 30/252, 254

[56] References Cited

U.S. PATENT DOCUMENTS

| | | | |
|---|---|---|---|
| 2,794,250 | 6/1957 | Bethune | 30/254 |
| 4,223,439 | 9/1980 | Rommel | 30/250 |
| 4,229,881 | 10/1980 | Troxel | 30/254 |
| 4,779,342 | 10/1988 | Kobayashi et al. | 30/250 |
| 4,809,433 | 3/1989 | Maxwell et al. | 30/254 |
| 4,899,445 | 2/1990 | Erbrick et al. | 30/251 |
| 5,184,404 | 2/1993 | Chen | 30/250 |
| 5,195,353 | 3/1993 | Erbrick et al. | 72/410 |
| 5,218,768 | 6/1993 | Putsch et al. | 30/250 |
| 5,231,763 | 8/1993 | Laux | 30/250 |
| 5,307,565 | 5/1994 | Erbrick et al. | 30/251 |

*Primary Examiner*—Hwei-Siu Payer
*Attorney, Agent, or Firm*—Hoffmann & Baron

[57] ABSTRACT

A cable cutting tool provides an improved blade configuration. The tool includes a pair of pivotally connected cutting blade members having facing curved cutting edges. Each curved cutting edge is in the shape of a spiral. Progressive movement of the cutting blades causes the cable to be progressively severed towards the pivot connection of the blades over large angular rotation. The cutting angles of the blades may be constructed so that the cutting angle is greater adjacent the inner portion of the spiral. This facilitates the effect of cutting cable constructed with hard cores or members (i.e., ACSR cable).

27 Claims, 18 Drawing Sheets

CABLE CUTTING TOOL HAVING AN IMPROVED CUTTING BLADE

FIELD OF THE INVENTION

The present invention relates generally to a tool for cutting cable. More particularly, the present invention relates to a cutting tool having an improved blade configuration for enabling the tool to more efficiently and effectively cut electrical cable.

BACKGROUND OF THE INVENTION

Cutting tools have long been known for use in cutting various types of cable. Common of all such cutting tools is the use of a pair of opposed movably supported cutting blades which accommodate the cable therebetween. Movement of the cutting blades towards one another effects slicing or cutting of the cable. Tools of this type, especially hand-held tools, take basically two configurations. The first is a simple scissor-type cutting tool where a pair of blades are mounted on adjacent ends of pivotally connected handles. The blades have opposed cutting surfaces between which the cable is positioned. Movement of the handles toward one another effects cutting action of the blades.

It is well known that this type of cutting tool may employ blades having straight cutting surfaces. In this manner, cutting engagement with a circular cable is ideally maintained at two opposed tangential points. Initially, this reduces the manual force needed to effect passage of the blades through the cable to effect cutting. However, this results in the need to apply an increased force as the cut nears completion. Also, this may result in damage or swaging of the cable ends during the cutting. This reduces the usefulness of the cable, or requires significant redressing of the cable ends prior to use.

Improved cutting tools such as the type shown in U.S. Pat. Nos. 2,794,250 and 4,229,881 attempt to solve the cable end problem by making curved cutting blades which at least partially circumscribe the cable during cutting. As shown particularly in the drawings of the '250 patent, the blades engage the cables nearly circumferentially. This enables the blades to cut through the cable without forcing the cable into an elliptical shape. While the '250 patent does describe limiting the arc-length engagement of the cutting blades with the cable during engagement, the actual engagement more closely approximates circumferential cutting than would be achieved with straight blades. While initially the curved blades of the '250 patent help maintain the cutting end in a circular configuration, it still requires increased manual effort to effect cutting.

Another type of hand-actuated cable cutting tool is the type where a pair of cutting blades are circumferentially movably connected at a hinge. Examples of such tools are shown in U.S. Pat. Nos. 4,223,439 and 5,184,404. A pair of movably connected handles are movable toward and away from one another to effect relative movement of the cutting blades under operation of a ratchet and pawl mechanism. The blades so supported define a bounded opening which surrounds the cable. This engagement assists in maintaining the cable in a circular configuration during cutting. In order to address the need for increased mechanical advantage to effect such circumferential cutting, these patents provide a ratchet mechanism to achieve a mechanical advantage. Continuous actuation of the handles causes the blade members to progressively close thereby severing the cable supported within the opening. Such tools, especially the tool shown in the '439 patent, are effective in cutting a cable and leaving a round end that needs little cable redressing.

The gradual curve of the blades of the '439 patent, especially near the end of the cutting cycle, effects an almond-like configuration for supporting the center or core of the cable for cutting. Referring to FIG. 1, the almond-like configuration provides for the cutting through of the center 1 of a cable at diametrically opposed locations, x—x spaced from the pivot point p of the blades 2 and 3. The cutting action is inward towards the center of the cable in a generally horizontal direction A—A. Near the end of the cutting cycle, while lesser force would ordinarily need be applied to cut the center portion or strand of the cable, a significant degree of manual effort is still required to cut the cable center due to the location and direction of cutting forces. Since a portion 4 of almond-like opening supporting center 1 of the cable is very narrow adjacent pivot p and tapers outwardly away therefrom, the tendency is to keep the center 1 of the cable away from the pivot p immediately thereadjacent.

While the tool of the '881 patent attempts to move the cable closer to the pivot, the particular shape of the blades shown therein fails to take full advantage of this feature. At a location nearest the pivot the blades define a similar almond-like configuration which fails to utilize the full mechanical advantage available.

Cables commonly used in the electrical industry for electrical conductivity are typically formed of copper and/or aluminum and may be of the type which are solid or stranded. While the tools described in both the '439 and '881 patents, with application of appropriate manual force, serve adequately to cut such copper or aluminum cables, it has been found that the particular configuration of the blades of these cutting tools make it difficult to cut cables formed of materials harder than copper or aluminum, say, for instance, steel. In many instances, tools such as these are sold in the commercial setting with an admonition against cutting steel cables. This is due, in part, because cutting blades specifically configured for cutting copper or aluminum are inappropriate and ineffective in cutting harder steel cable. Similarly, other blade configurations in other tools specifically designed for cutting steel would crush or otherwise damage copper or aluminum cables beyond the point at which the cut ends are useful.

The electrical industry has also seen the increasing use of a specialized cable known as aluminum cable steel-reinforced (ACSR). This type of cable includes one or more center reinforcing steel strands which are surrounded by outer strands of softer metal, such as aluminum. The cable cutting tools described above are inadequate in addressing the need to cut ACSR cable. As the almond-shaped configuration of the blade opening provided thereby holds the center strand 1 of the cable away from the pivot point p as shown in FIG. 1. The tool cannot effectively cut through the center strand due to blade damage and greater required force.

It is therefore desirable to provide a tool having an improved blade configuration. The improved tool would reduce the necessary force by keeping the cutting action close to the fulcrum, spread the required force over an extended distance to equalize and minimize force values, concentrate power where needed and reduce cable distortion. Such configuration would permit the easy and reliable cutting of many types and configurations of cable, including ACSR.

SUMMARY OF THE INVENTION

It is an object of the present invention to provide a cable cutting tool having improved cutting blades where the cutting edge of the blades have a spiral configuration.

It is a further object of the invention to provide a spiral cutting blade where the configuration minimizes arc-length engagement with the cable, permitting cutting of the cable with decreased manual force.

It is a still further object of the present invention to provide a cable cutting tool having pivotally connected cutting blades of spirally curved configuration, where during the cutting cycle the center of the cable is drawn towards the pivot to reduce the force needed to cut the cable.

It is yet another object of the invention to provide pivotally connected spiral cutting blade where full cable cutting is achieved over a greater degree of rotation of the cutting blade to extend the cutting cycle and thereby reduce the manual force necessary to cut the cable.

It is an additional object of the present invention to provide a cable cutting tool having blades specifically configured to cut cable having an outer annular configuration and a harder inner core.

In the efficient attainment of these and other objects, the present invention provides a tool for cutting cable. The tool includes a pair of cutting blades operably connected at a pivot for progressive movement toward each other. At least one of the blades includes an elongate cutting edge. The cutting edge is configured in the shape of a uniform spiral, which spirals inwardly toward the pivot. The cutting blade configuration extends the cutting cycle of the cable over a greater degree of blade rotation. This minimizes the force that need be applied to cut the cable. The blade configuration also provides for progressive movement of the cable towards the pivot so that the inner core of the cable is cut next adjacent the pivot. This enables the tool to be more effectively employed in cutting various types of cable, including cable having an outer annular configuration and a harder cable core.

As shown by way of a preferred embodiment herein, the present invention further provides the spiral cutting edge with an outer portion with an optimum blade angle for cutting the material of the outer configuration of the cable which may be, for example, aluminum. The inner portion of the spiral cutting edge includes an optimum blade angle for cutting the cable core which may be, for example, steel. Thus, the present invention is particularly suitable for cutting ASCR.

DETAILED DESCRIPTION OF THE PREFERRED EMBODIMENT

Figure 2:
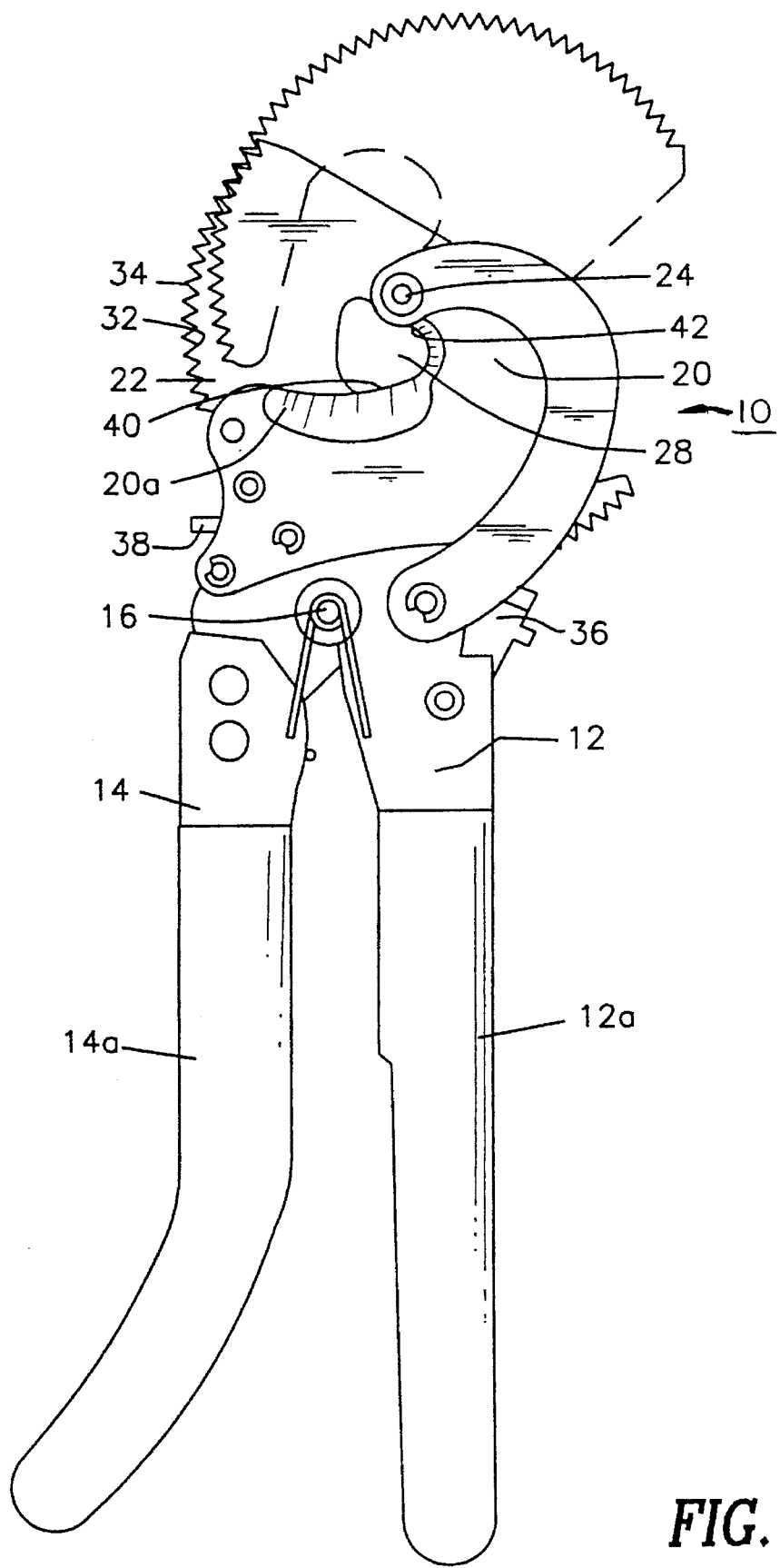
FIG. 2 is a front elevational showing of a preferred embodiment of the cable cutting tool of the present invention.
Figure 3:
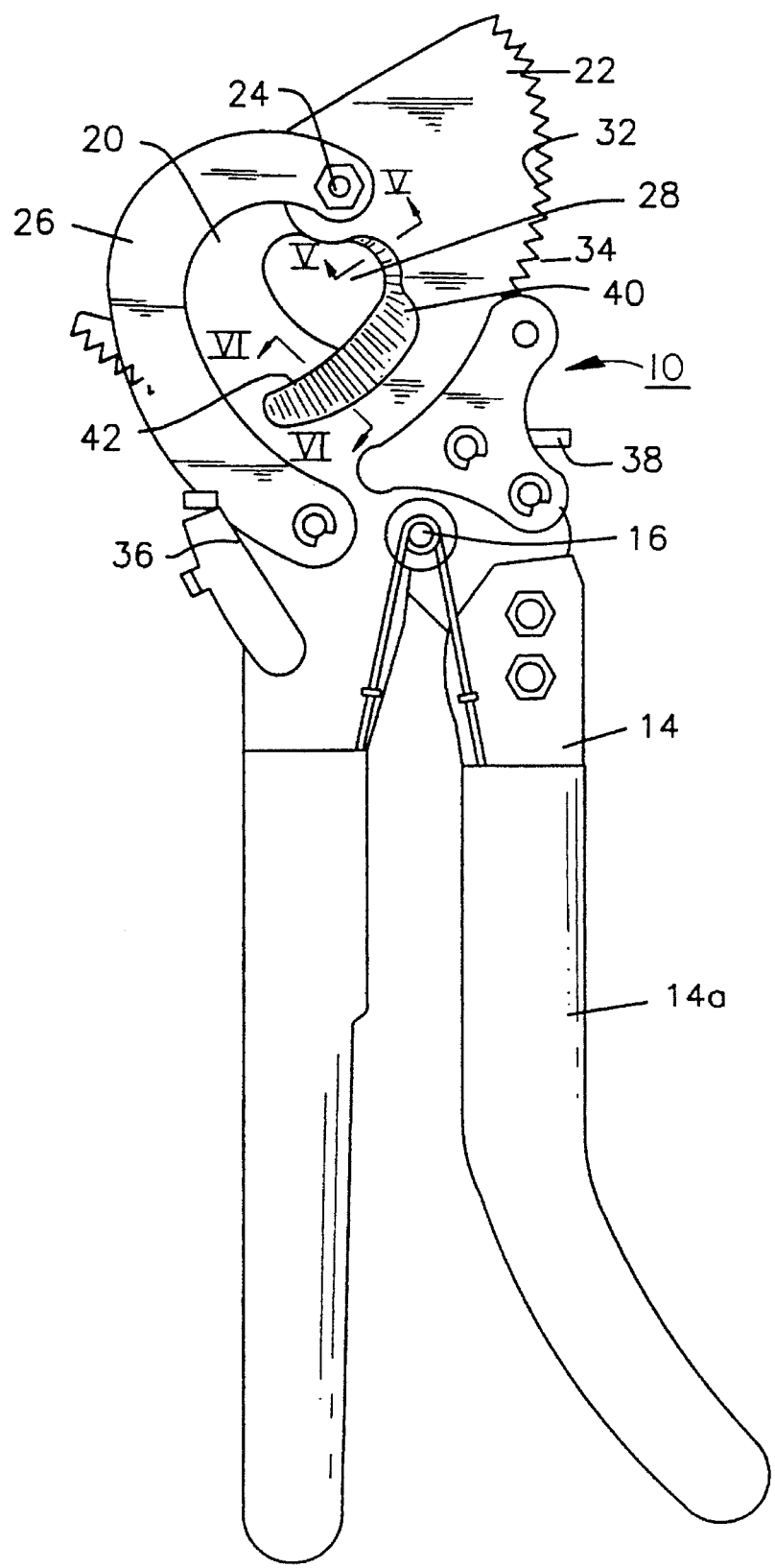
FIG. 3 is a rear elevational showing of the cable cutting tool of FIG. 1.
Figure 4:
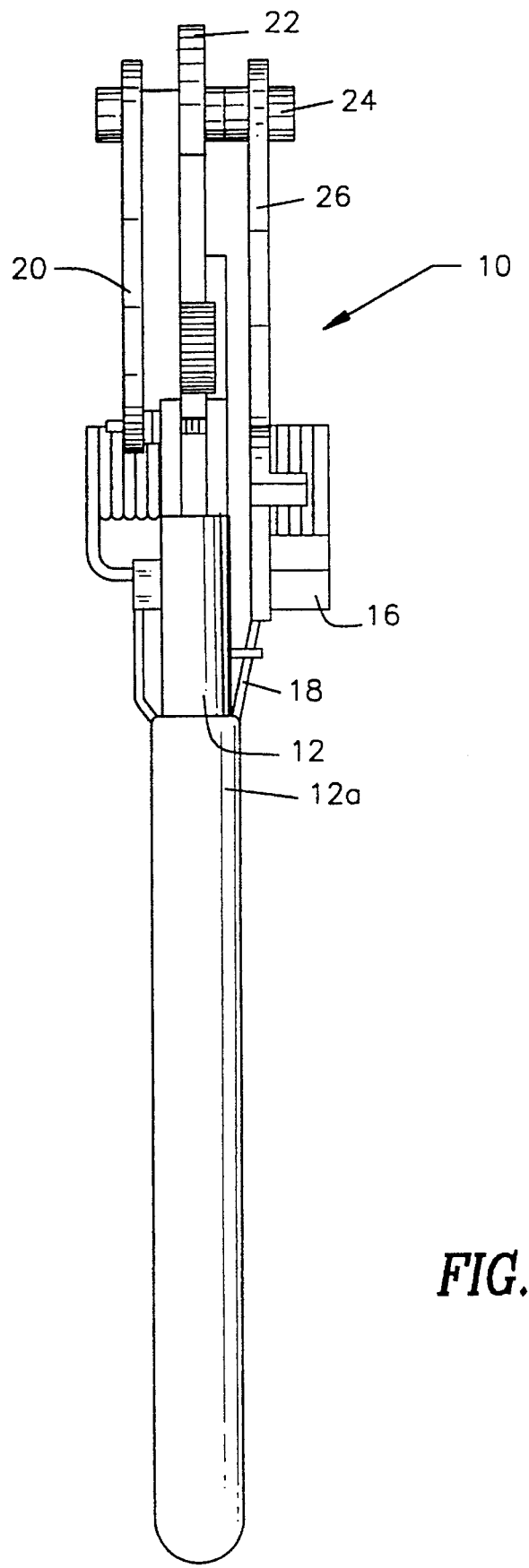
FIG. 4 is a side plan view of the cable cutting tool of FIG. 1.

Referring initially to FIGS. 2–4, a hand-held cable cutting tool 10 of the present invention is shown. Tool 10 is generally of the hinge-type configuration including a pair of elongate handles 12 and 14 which are pivotally connected at a connecting bolt 16 for relative movement therebetween. In typical construction handle 12 is a stationary handle while handle 14 is movable with respect thereto. A spring assembly 18, which is attached to both handles 12 and 14 about bolt 16, tends to spread handles 12 and 14 apart during moveable actuation thereof. Handles 12 and 14 are appropriately shaped so that they can be operated in a convenient hand-held manner and include handle grips 12a and 14a, respectively, which also facilitate actuation of the handles. While the specific tool shown herein is of the hand-held type operable by one-handed manual actuation of the handles 12 and 14, it is within the contemplation of the present invention to provide for power actuatable tools. Such tools may be actuated by electrical or hydraulic power as is well known in the cutting tool art.

As shown in FIGS. 2–4, the upper end of tool 10 includes a curved, fixed cutting blade member 20 affixed to the end of stationery handle 12. In opposed facing fashion, a curved moveable cutting blade member 22 is pivotally connected to fixed blade cutting member 20 at a pivot pin 24 at the upper end of tool 10. An elongate generally curved blade support 26 extends between stationery handle 12 and pivot pin 24 to support moveable blade member 22 adjacent fixed blade member 20. Moveable blade member 22 is fully circumferentially rotatable about pivot pin 24 between curved blade support 26 and fixed blade member 20.

As shown in FIG. 2, such movement of moveable blade member 22 defines a bounded nest or opening 28 with fixed blade member 20 for accommodation of electrical cable 30 (FIG. 7) therein. Movement of moveable blade member 22 toward fixed blade member 20 causes constriction or narrowing of the opening 28 to effect a shearing or slicing of cable 30 held between cutting blade members 20 and 22. In order to effect proper relative movement between fixed blade member 20 and moveable blade member 22 in a manner which accomplishes the cutting of cable 30, an appropriate ratchet mechanism is provided. Moveable blade member 22 includes an arcuate spline 32 having gear teeth 34 therealong. Gear teeth 34 of spline 32 are engagable with an appropriate pawl element (not shown), which is actuatable upon moveable actuation of handles 12 and 14. The pawl mechanism in conjunction with gear teeth 34 provides for ratchet-type movement of moveable blade member 22. Continued repetitive movement of moveable handle 14 with respect to stationery handle 12 causes ratchet movement of moveable blade member 22 with respect to fixed blade member 20 in a manner which closes cable opening 28 effecting slicing or cutting of the cable thereat. Such movement is shown in a counter-clockwise direction in FIG. 2. A latch 36 (FIG. 3) is provided so as to lock tool 10, preventing actuation of handles 12 and 14 where appropriate. Further, a release mechanism 38 is also provided to disengage the ratchet and pawl mechanism allowing the moveable blade member 22 to be manually released and moved in either rotational direction.

The general construction and operation of tool 10 of the present invention is substantially similar to hand-held cutting tools of the type shown and described in U.S. Pat. No. 4,223,439 issued to Rommel on Sep. 23, 1980 and U.S. Pat. No. 5,184,404 issued to Chen on Feb. 9, 1993, the disclosures of these patents are incorporated by reference herein for all purposes. In its preferred embodiment, tool 10 may employ a ratchet mechanism, for the operational movement of moveable blade member 22 with respect to fixed blade member 20, which is of the type more fully shown and described in commonly assigned U.S. Pat. No. 4,899,445 issued to Erbrick, et al, on Feb. 13, 1990, and U.S. Pat. No. 5,307,565 issued to Erbrick, et al, on May 3, 1994, the disclosures of these patents also being incorporated herein by reference for all purposes.

The present invention provides cutting blade members 20 and 22 of improved blade configuration such that tool 10 may be used advantageously for the cutting of a wide variety of configurations of cables in a manner where significantly less manual or other force need be applied.

It is within the contemplation of the present invention that tool 10 may be used to cut insulated and non-insulated copper or aluminum electrical cables, steel catenary wire used as a messenger cable to support electrical, telephone or fiber optic conductors or other cables of differing configurations. The present invention may also be used in cutting other types of work pieces, such as re-bar or other items not generally referred to as cables. Further, the specific configurations of the blades, within the contemplation of the present invention, may be selected to cut specific cable configurations. As mentioned above, one such cable commonly used in electrical applications is aluminum cable steel reinforced, known as ACSR.

As shown in FIGS. 2 and 3, each of fixed blade member 20 and moveable blade member 22 include a specific blade configuration which is preferably of identical construction. For simplicity of description, reference will be made to construction of fixed blade member 20. It, however, may be appreciated that this description also applies to movable blade member 22. Fixed blade member 20 shown in FIGS. 2 and 3 includes a curved, inwardly directed elongate cutting surface 40 extending between pivot pin 24 and a distal end 20a thereof. Cutting surface 40 defines a curved knife-like cutting edge 42 which facilitates cutting or shearing of cable 30 (FIG. 7) supported within opening 28.

Figure 7:
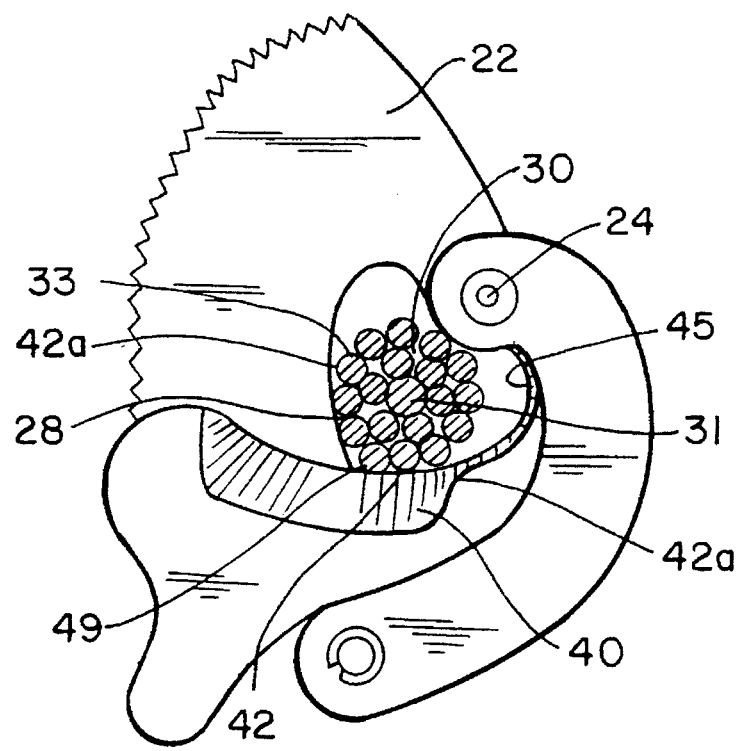
FIGS. 7 and 8 show the cutting blades of the cable cutting tool of FIG. 3, progressively cutting through a cable.
Figure 8:
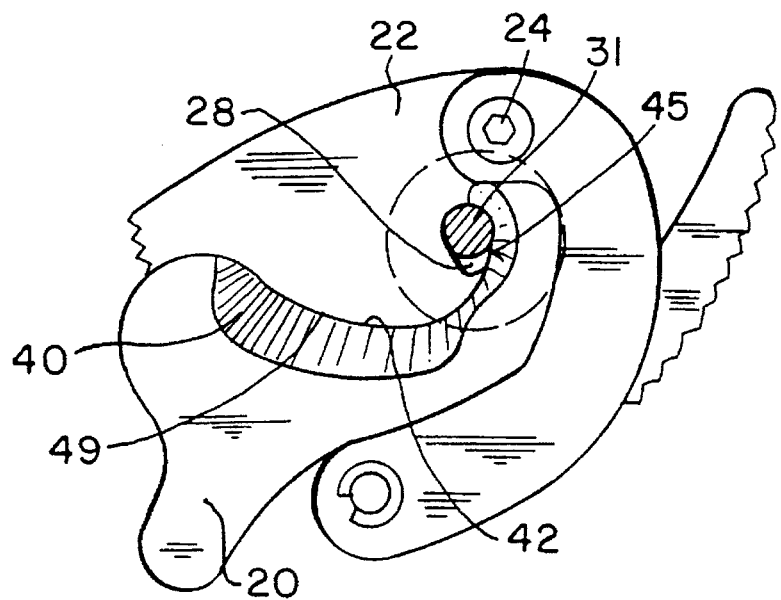

As more particularly shown in FIGS. 7 and 8, the present invention provides a blade configuration where the curvature of the cutting edge 42 of blade 22 approximates a spiral-like configuration. That is, the radius of curvature along the blade is directly proportional to the angle subtended from the center of the spiral. Such spirals may take the shape, but not be limited to, a spiral of Archimedes or a logrhythmic spiral. The spiral configuration described herein has a gradual radius of curvature at an outer portion and a tighter radius of curvature at an inner portion and has been found to be particularly advantageous in the progressive cutting of cable, especially, as will be described hereinbelow, in the cutting of ACSR.

As shown in FIG. 7, ACSR cable 30 typically includes a single strand center core 31 formed of steel and an outer stranded cable configuration 33 formed of aluminum. The harder central steel core 31 is used as a reinforcing strand providing structural stability to the cable. The outer aluminum stranded configuration 33 serves as the electrically conductive portion. Heretofore it has been difficult to cut ACSR cable with a single cutting tool. Presently available tools have blade configurations that do not provide the ability to effectively cut cable having a cable core and outer configuration of different hardnesses. The present invention provides an improved blade configuration which enables effective cutting of such cables, particularly ACSR cables, as well as cutting other types of cable in a more effective manner.

The present invention contemplates forming each blade to approach a theoretical spiral to more fully take advantage of the benefits of such shape as will be described hereinbelow.

Figure 9:
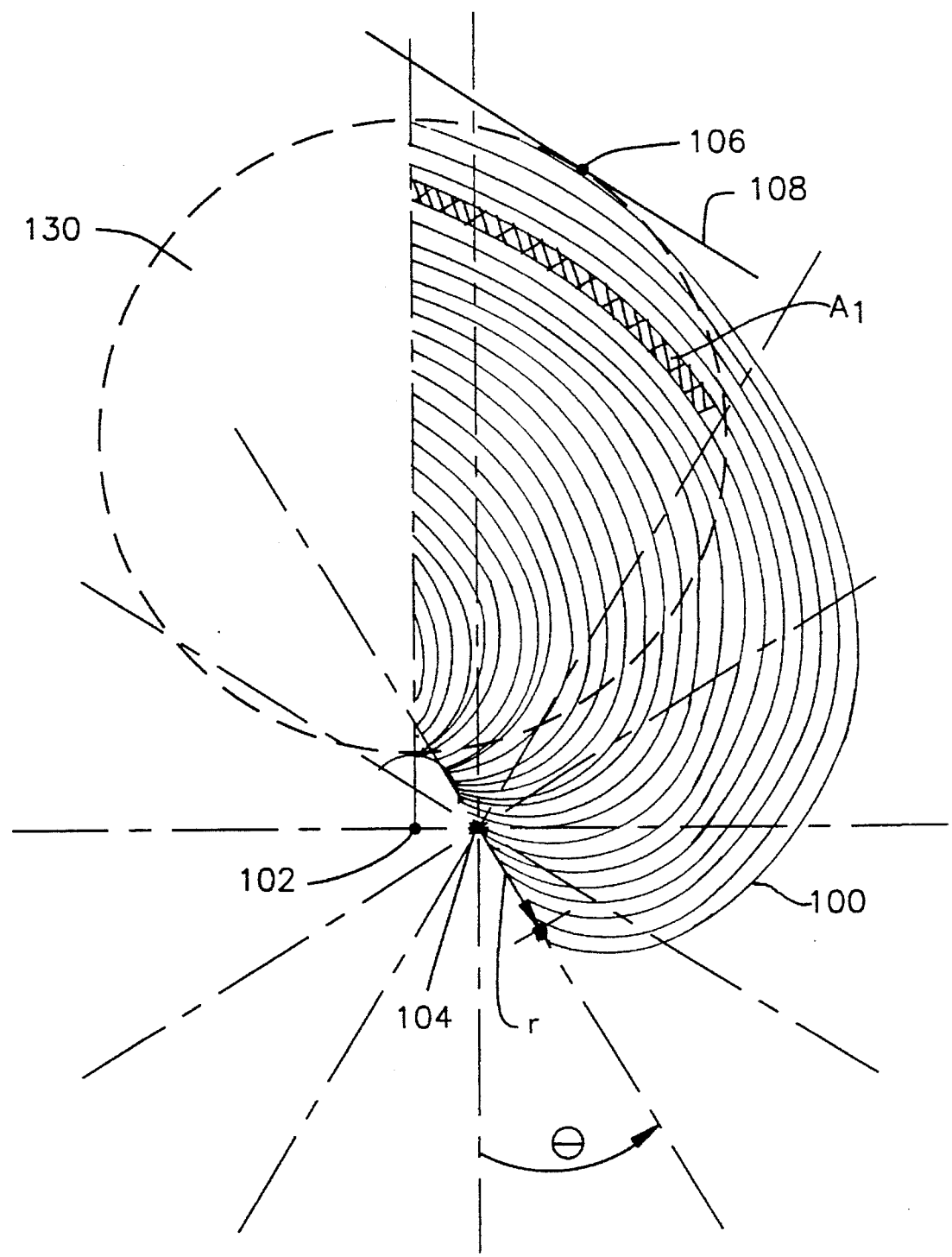
FIG. 9 shows schematically the relationship between a spiral shaped cutting blade of the present invention and the cable.

FIG. 9 shows schematically a typical spiral, in this case a spiral of Archimedes where r, the vector length of each point on the spiral equally increases for each successively equal angle $\theta$. The spiral 100 may represent one of a pair of facing cutting blades which are connected at a pivot point 102. The pivot point 102 is offset the center point 104 from which the spiral is generated. This offset is necessary as in practice the blades must be connected by a bolt and therefore blade material must be provided away from the spiral cutting edge. Thus, the theoretical center of the spiral of cutting edge is spaced from the pivot so as to provide support for the bolt.

FIG. 9 further shows successive movement of spiral 100 about pivot point 102. Each successive curve represents equal incremental rotative movement (about 5°) of the cutting blade and may represent one or more "clicks" of the ratchet mechanism of tool 16.

Also shown in FIG. 9 is circle 130 representing cable 30 positioned in its initial cutting position with respect to spiral 100. Cable 130 is shown initially in engagement with spiral 100 in a first or initial position. The spiral lies against the outer circumference of cable 130. This engagement shown at 106 approaches a near tangential engagement with an imaginary tangent line 108. This initial cutting engagement between spiral 100 and cable 130 is at a minimum of arc-length engagement. This assists in reducing the manual force necessary to effect initial cutting of cable 130. The continued cutting engagement between spiral 100 and cable 130 is effectively controlled by the shape of the spiral as it progressively moves through cable 130 towards the pivot point 102. Cutting is accomplished by an extended rotational movement of the spiral resulting in small incremental movement of the cutting edge through the cable toward the pivot.

With each 5° movement (one or more "clicks" of the ratchet and pawl mechanism of tool 10), the work done and consequently the force required is directly proportional to the area traversed by the spiral 100 through cable 130 as shown in FIG. 9. This is shown by the area under the curve of spiral 100 through cable 130. One such incremental segment $A_1$ is shown shaded in FIG. 9. The spiral 100 minimizes the area cut by each "click" of the tool mechanism so that the force required by each click is minimized.

Additionally, the force required to cut through cable 130 is also minimized by the shape of spiral 100, as the exaggerated spiral shape requires the blade to traverse through a greater rotational angle to fully cut through cable 130 than is provided in a prior art tool. In a preferred embodiment of the present invention (FIGS. 2–4), in order to fully cut through cable 130 a full 280° of blade rotation is necessary. It has been found that in prior art tools (such as those enumerated above), the blade configuration requires at most 150° of blade rotation to fully cut through a cable. While such small rotational movement may more quickly cut a cable, it does so at the expense of high manual force at each incremental cut.

FIG. 9 shows about one-half the movement of spiral 100 necessary to cut through cable 130 in 5° increments. By extending the cutting cycle over a greater rotational distance the force required to cut each segment is accordingly reduced. Thus, while the total work done (cutting the entire cable) is identical, the distance over which such cutting occurs is extended and therefore the force required per unit movement is decreased.

Figure 10:
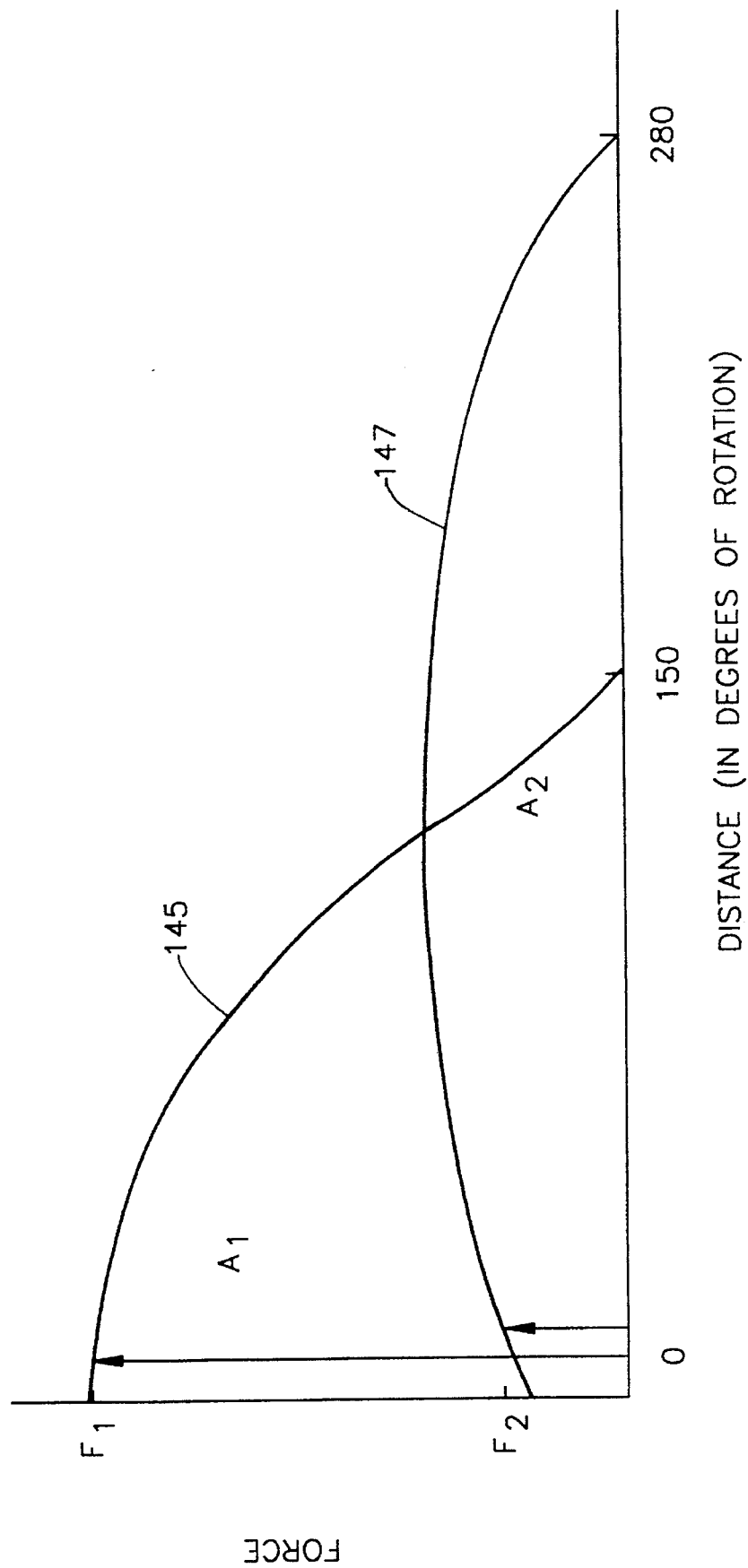
FIG. 10 shows graphically the curves representing the force necessary to cut through a cable with the prior art blade construction and with the blade construction of the present invention.

Referring now to FIG. 10, the force required to cut cable 130 through the rotational movement of the blades is shown. The x-axis represents the rotational movement of the blades (0° being the beginning the cutting cycle as described above). The y-axis represents the force needed to cut through the cable. The area under the curve is the work done (force through distance). Curve 145 is the curve representing the prior art tool where total cable cutting is achieved over minimum blade rotation. As a schematic example, curve 145 shows rotation of a prior art tool of 150°. Curve 147 is the curve representing the tool of the present invention where total cable cutting is achieved over 280° of rotation. As the work done, (the cutting of cable 130) is identical for each tool, the area $A_1$, $A_2$ under each curve 145 and 147 is equal. However, as curve 145 extends over only 150°, such work must be accomplished over a smaller distance (rotational movement) as compared with curve 147.

As graphically shown, the force required at the initial stages of cutting for the prior art tool $F_1$ (curve 147) is significantly higher than is required with the tool of the present invention (curve 145) $F_2$. In the present invention, the installer need not overcome a substantial manual force to initiate the cut as is required in prior art tools. The spiral 100 of the present invention effectively "flattens" the force curve. Since the operator is limited by the maximum force needed to cut through the cable the present invention provides a significant advantage in cutting tools, especially where hand force is applied. Also, any power assisted mechanism such as an electric, battery, hydraulic or mechanical device used in conjunction with the tool must be designed to operate under the highest force conditions encountered. Accordingly, with conventionally shaped blades the power mechanism employed must be larger, heavier, or use exotic material to accomplish cutting of the cable. The problem of high initial force application is especially troublesome in connection with battery operated portable tools where spikes in the force applied have a tendency to discharge a battery prematurely. Rechargeable batteries such as NiCad batteries are particularly susceptible to premature discharge due to such spikes.

Thus, as shown by the curves 145 and 147, the present invention achieves the same level of work, i.e., the cutting of cable 130 as represented by the area under the curves, without the increase in initial force required by the tools of the prior art. The tool of the present invention achieves this by the effective management of force and distance. By increasing the distance (rotation of the blades) and the blade-cable engagement by the particular shape of spiral 100, the force needed to cut cable 130 need not be as high to accomplish the same amount of work.

While the theoretical spiral 100 of the present invention serves to cut cable of uniform hardness such as aluminum or copper, the spiral shapes shown herein are also advantageous in cutting cable of different construction such as ACSR. In such cases the spiral can be further modified such that the work will be equalized over the rotation of the blades. When cutting ACSR cable having a hard steel core the spiral can be modified to have a more dramatic or tighter curve nearer the pivot point. Thus r would increase more rapidly than r=θ. In such cases, r would be equal to some exponential function of θ. This produces a spiral (such as logrhythymic spiral) which is very "tight" adjacent the pivot point. Thus, at the end of the cutting cycle when the smaller steel core is encountered, the blade design provides for the cutting of the core without any significant increase in the applied force.

Figure 11:
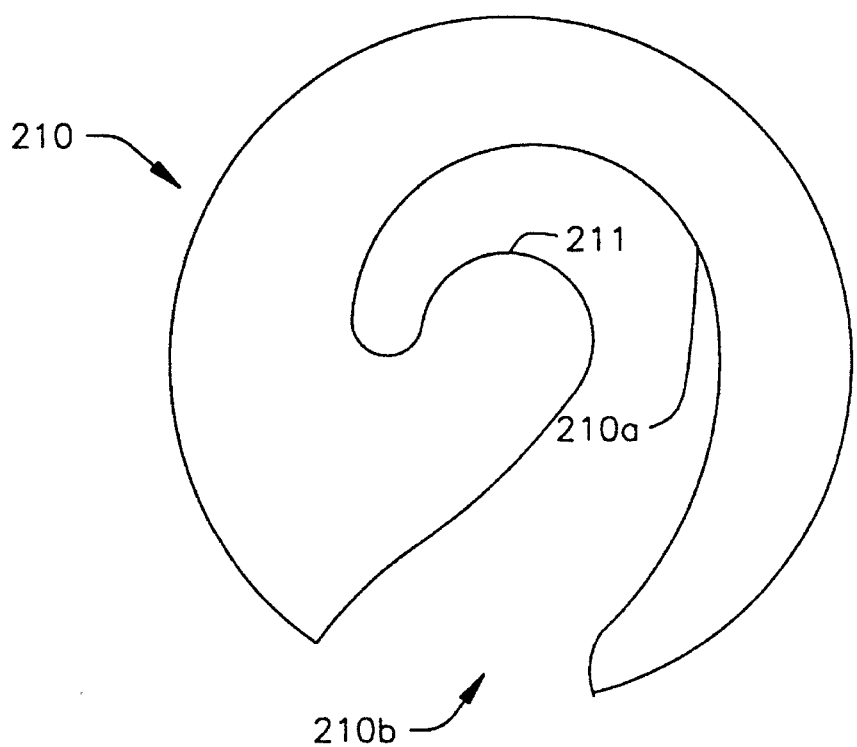
FIGS. 11 and 12 are top plan views of a further embodiment of cutting blades formed in accordance with the present invention.
Figure 12:
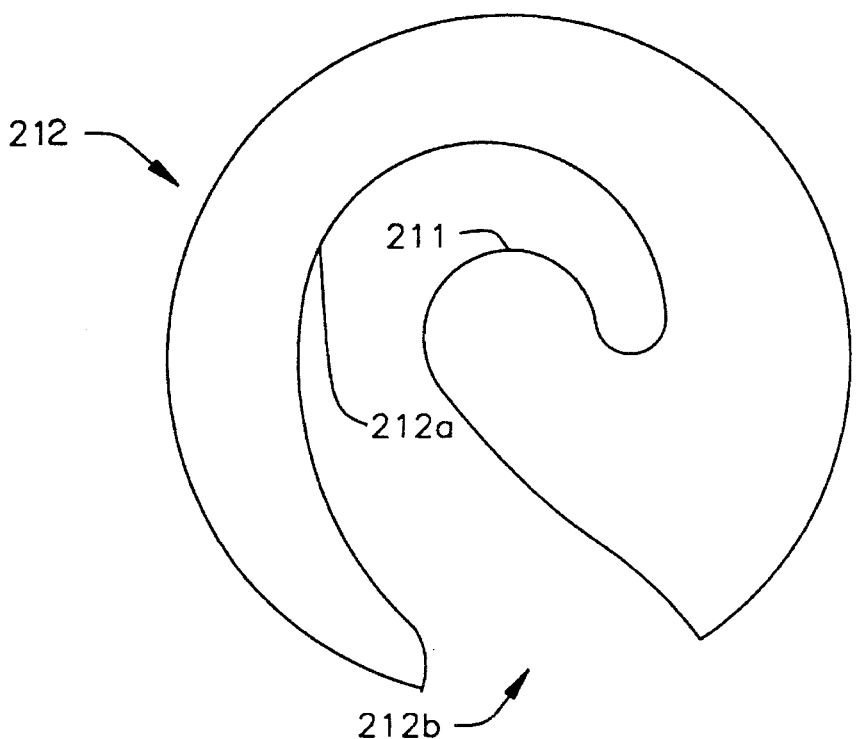

The further benefits of the spiral shaped cutting blades of the present invention are more fully shown with reference to FIGS. 11–17 where the spiral cutting blades may be constructed to more fully take advantage of the extended rotational movement thereof. Blades 210 and 212 shown respectively in FIGS. 11 and 12, may form opposed blades of a cutting tool (not shown). The blades may be rotatably coupled at respective central pivots 211. The tool employing such blades may either be a manually operated ratchet-type or may be a tool which is powered by an appropriate mechanism. Blades 210 and 212 each include a full uniformly spiraling cutting edge 210a and 212a, respectively. As is shown in FIGS. 11 and 12, the spiral cutting edges 210a and 212a traverse an extended spiral length over that shown in the previous embodiments. The spiral blades have respective entry openings 210b, 212b through which a cable may be inserted.

Figure 13:
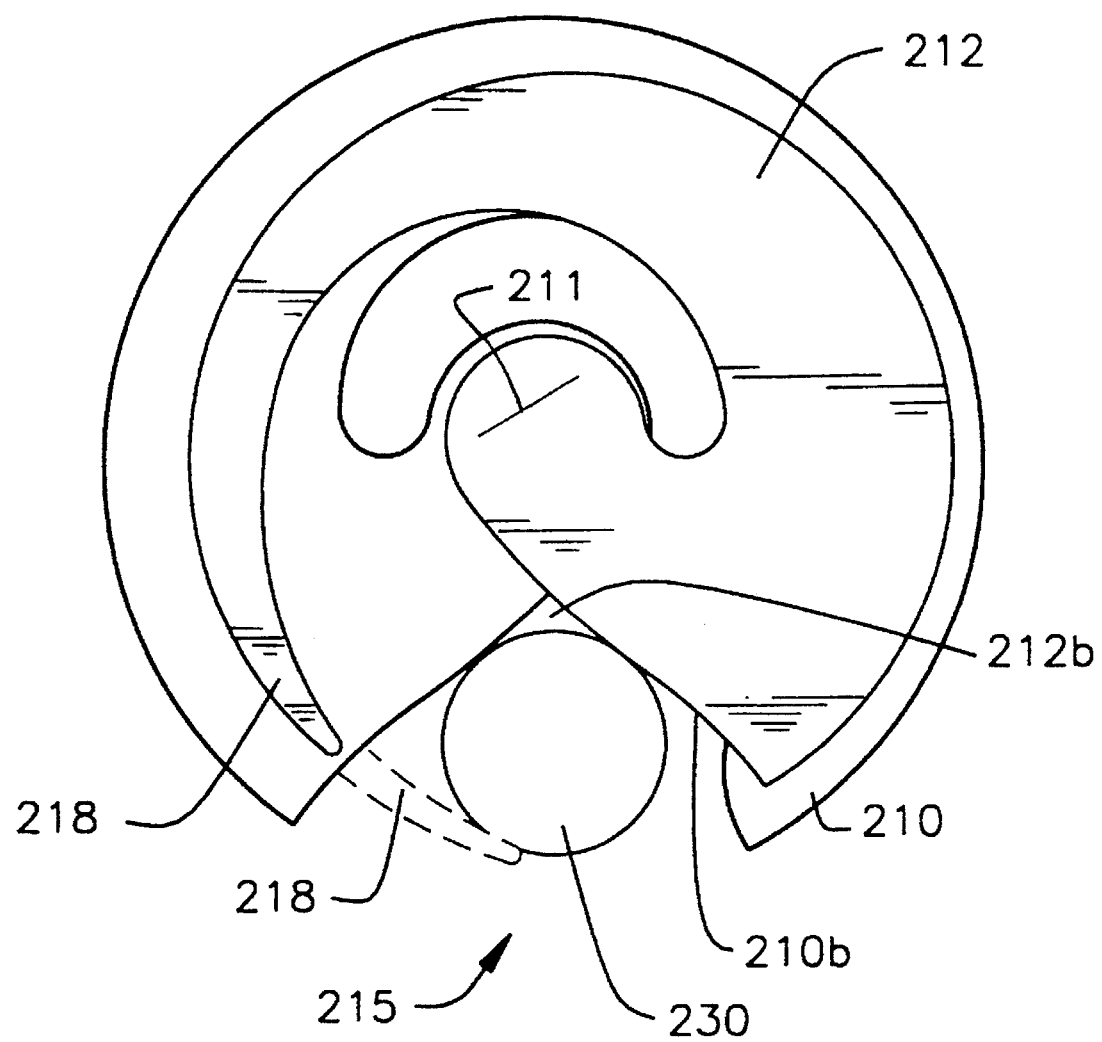
FIGS. 13–17 show the cutting blades of FIGS. 11 and 12 coupled at a pivot for progressive rotational movement in order to affect cutting of a cable supported therebetween.

Referring now to FIGS. 13–17, the blades 210 and 212 are shown coupled at respective pivots 211 for oppositely directed relative rotative movement. The schematic progressive movement of the blades 210 and 212 and the cutting of cable 230 thereby is now illustrated. The remainder of the tool has been omitted for clarity. Blade 212 as shown in FIG. 13 is positioned on top of blade 210. Again for simplicity of description, reference will be made to the rotational movement of blade 212 in a counter-clockwise direction. It may however, be appreciated that in actual operation both blades 210, 212 may be rotated simultaneously in opposite directions.

Initially, blades 210 and 212 are positioned so that a cable entry area 215 is established between the blades adjacent entry openings 210b and 212b. As blade 212 begins its counter-clockwise rotation, the distal tip 218 thereof engages cable 230 (as shown by dotted lines) and forces it into the tapering entry opening 210b of the spiral of blade 210. At the same time, cable 230 enters the tapering entry opening 212b of the spiral of blades 212. Such relative movement of the blades with respect to cable 230 causes the cutting of the cable 230 as the intersection of the spiral cutting edges move closer to the pivot.

Figure 14:
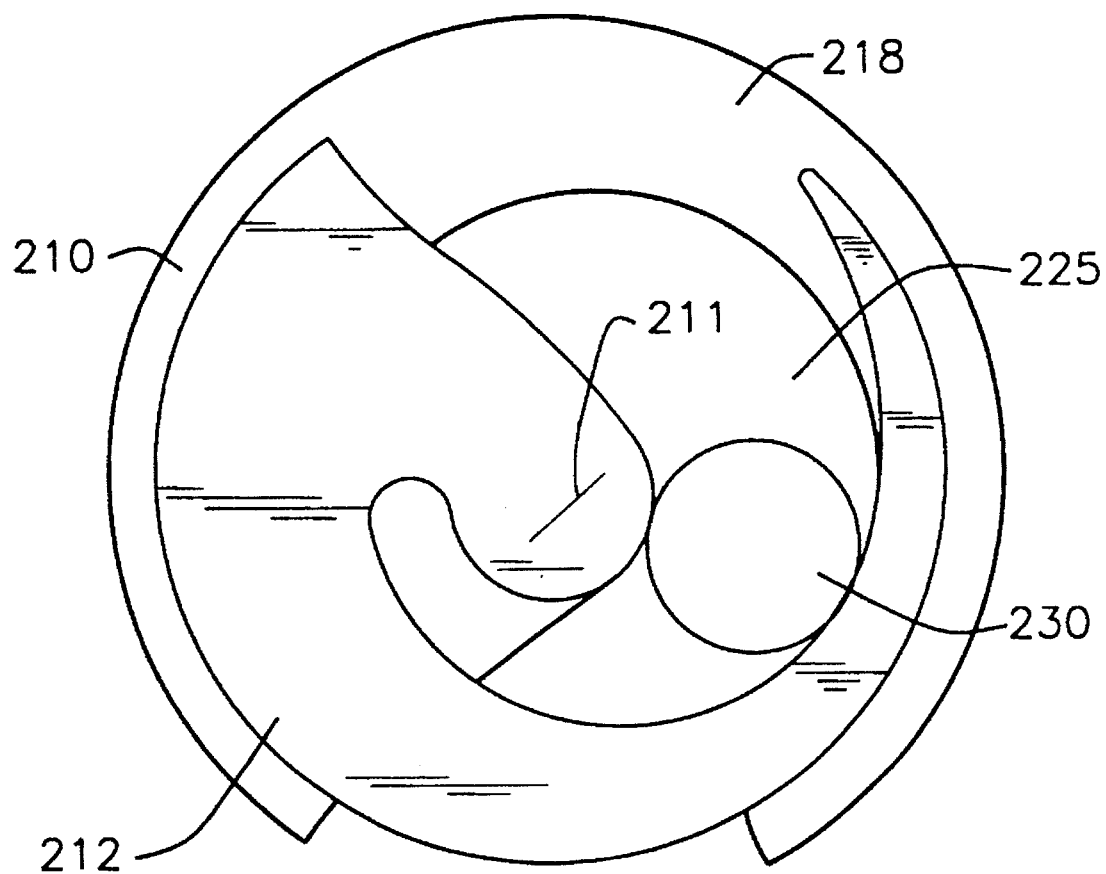

Referring now to FIG. 14, blade 212 is shown rotated approximately 180°. Cable 230 has been urged further into the cutting space 225 defined between the two opposed spirals and the further cutting of cable 230 is achieved.

Figure 15:
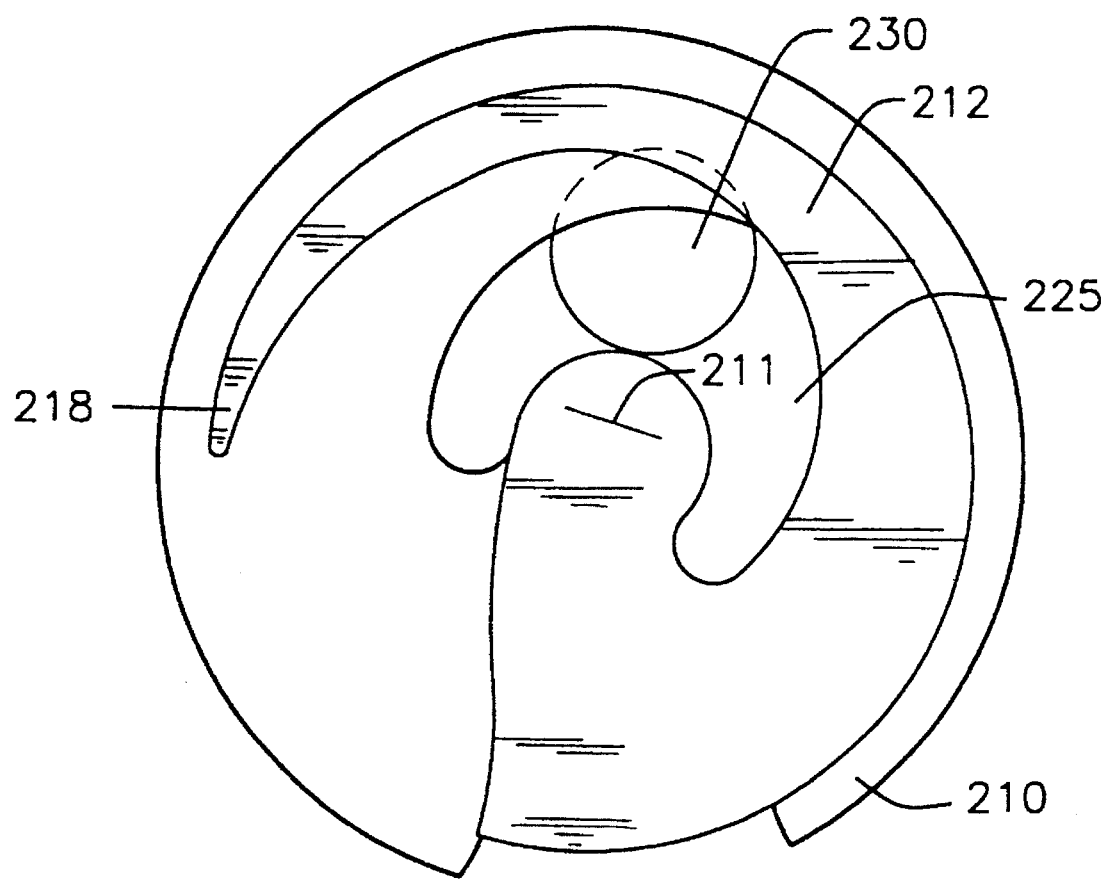

With further reference to FIG. 15, blade 212 is shown rotated approximately 270° from its initial position shown in FIG. 13 and further cable cutting is accomplished. Movement of the spiral cutting blade 212 urges the cable 230 further into cutting space 225 between the two opposed spirals.

Figure 16:
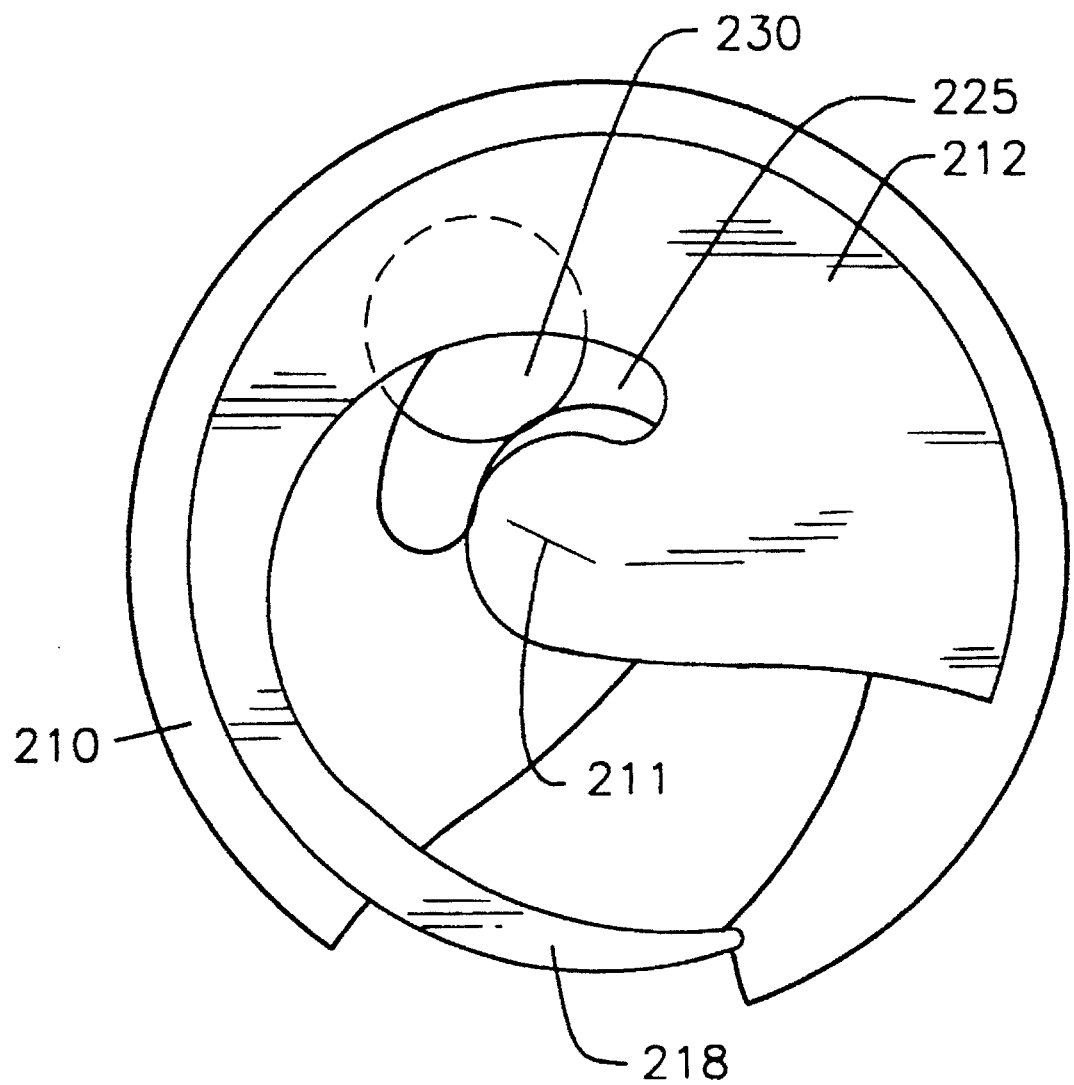

Still further movement of blade 212 is shown in FIG. 16 where approximately 360° of rotation of blade 212 has been achieved. As can be seen, further movement of cable 230 through the opposed spirals is accomplished while the blades have cut further into the cable.

Figure 17:
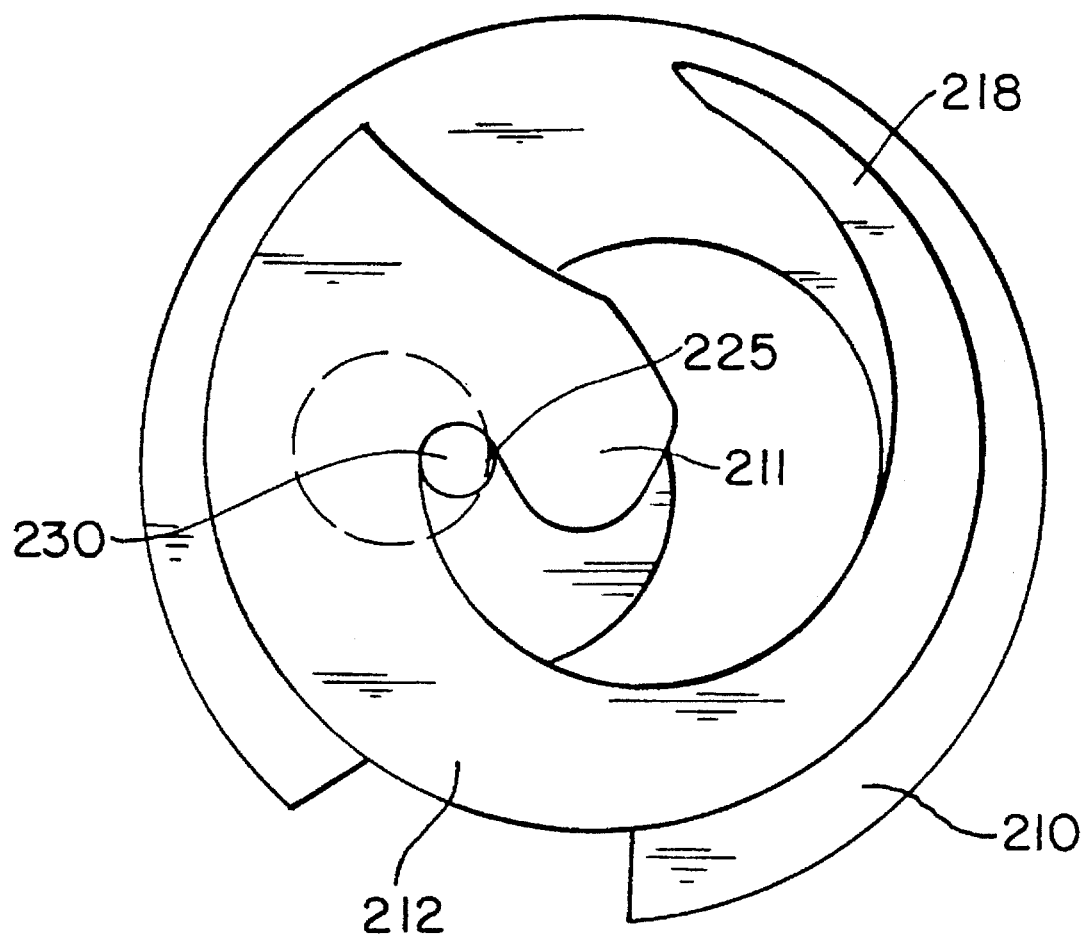

Referring to FIG. 17, approximately 540° of rotation of blade 212 has been achieved. In this position, the blades have nearly cut fully through cable 230. It is also noted that near the end of the cutting cycle, the shape of the cutting space 225 between the blades effects more of a pear-like configuration which as will be described hereinbelow, provides additional mechanical advantage as the cutting area is moved closer to the pivot point 211 of the blades. Further rotational movement of blade 212 from the position shown in FIG. 17 will effect the full severing of cable 230.

As may be appreciated, the particular shape of blades 210 and 212 accomplish cutting of cable 230 over an extended relative rotational movement of the blades. In the present illustrative embodiment, cutting is achieved over a rotational movement of over 540°. Thus, as described above, the force required to cut cable 230 is minimized by the significant increase in distance (rotation of the blades) achieved by the spiral cutting blades of the present design.

Referring to the construction of a preferred embodiment of the present invention, FIG. 7 shows cable 30 positioned between the respective cutting edges 42 of cutting blades 20 and 22. In this position, blades are brought together to initially engage the outer surface of cable 30. The particular spiral shape of cutting edges 42 where the outer portion 49 of the spiral has a more gradual curvature than the inner portion 45, as described above, provide for only minimal arc-length engagement with the outer circumference of the cable. Such engagement is maintained between blades 20 and 22 and cable 30 at only two spaced apart circumferential locations, denoted as 42a.

Figure 1:
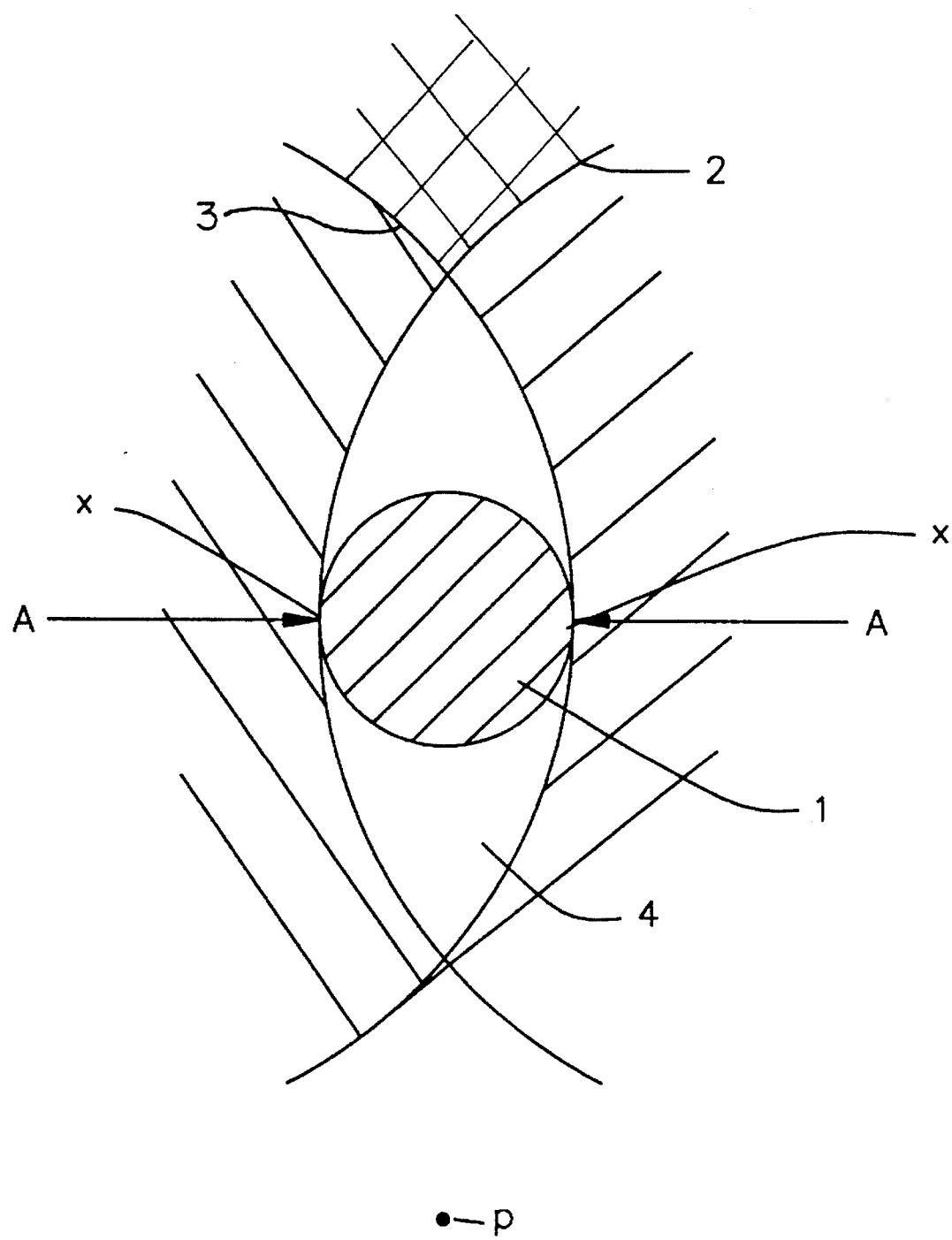
FIG. 1 is a schematic representation of a pair of cutting blades of a prior art device attempting to cut through a center portion of an electrical cable.

Upon further continued cutting movement of blades 20 and 22 towards one another, a further advantage of the shape of the blades is shown. The increasingly reducing radius of curvature of the spiral towards pivot pin 24 forces the center (or center strand 31) of cable 30 toward pivot pin 24. As shown in FIG. 8, this permits the center or center strand 31 of cable 30 to be cut at a location next adjacent the pivot pin 24. The spiral shape of cutting edge 42, especially at inner portion 45, provides a shape which is more pear-like, that is, the bottom of the opening adjacent pivot pin 24, is wider so that the center strand is positioned adjacent the pivot pin. At this location the mechanical advantage provided by the pivotally connected blades 20 and 22 is the greatest. This permits the easy severing of the center strand 31 of cable 30 even where ACSR is employed having a hardened steel center strand. Prior art tools, such as shown in FIG. 1, achieve engagement at a location more remote from the pivot. This necessitates a greater degree of force to be exerted in order to sever the center of cable 30.

Figure 5:
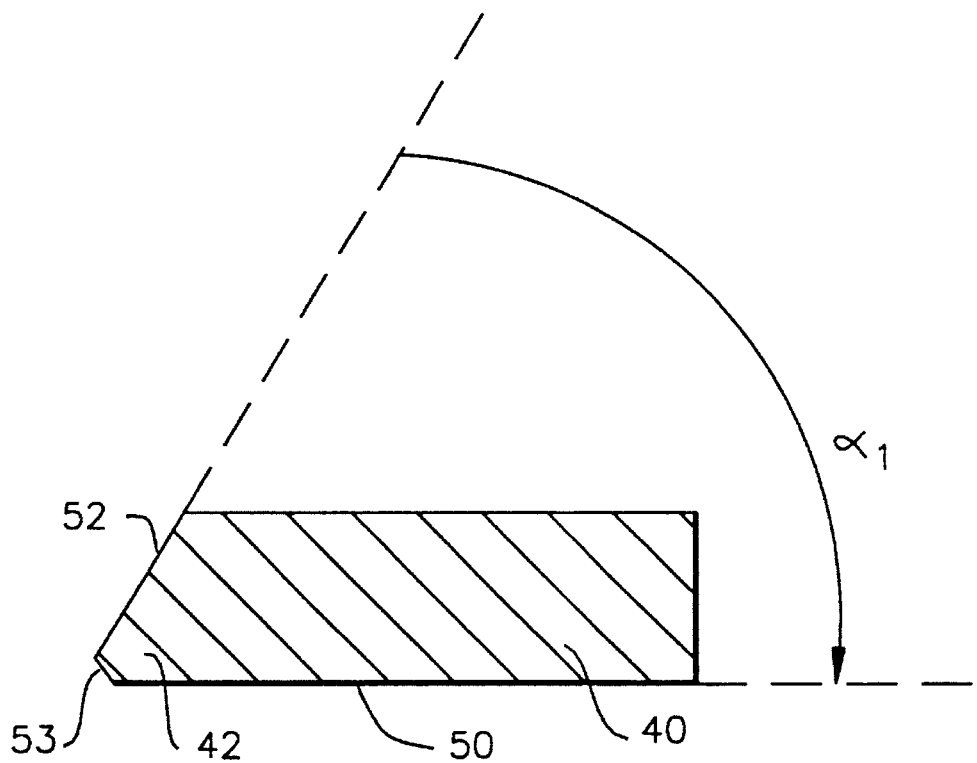
FIGS. 5 and 6 show in cross section, portions of the cable cutting blades of FIG. 3 taken through the lines IV—IV and V—V, respectively.
Figure 6:
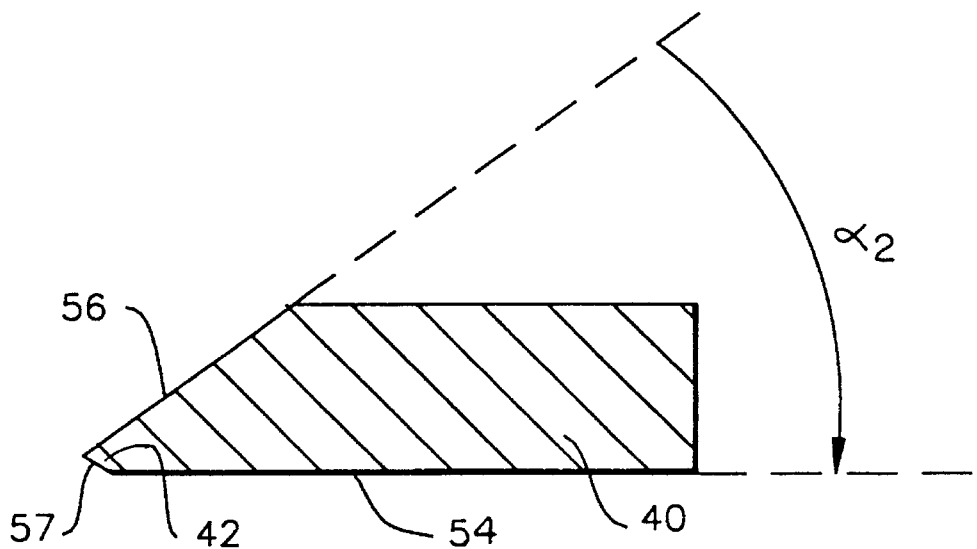

An additional feature of the present invention is shown with additional reference to FIGS. 5 and 6. In order to further assist in the severing of ASCR cable 30 having a steel inner core 31, the knife-like edges of cutting surface 40 at locations along the spiral of cutting edge 42 are differently configured so as to more efficiently sever the appropriate portion of the cable.

Referring to FIG. 5, the cross-sectional shape of the knife-like cutting edge along the inner portion of the spiral forming cutting edge 42 is shown. Typically, the cutting surface is defined by a straight back wall 50 and an angularly disposed cutting wall 52 which meet generally at an apex 53 defining the cutting edge 42 thereat. In order to effectively sever the harder center strand core 31 of cable 30, the angle $\alpha_1$ defined between the back wall 50 and cutting wall 52 is generally a wide angle which imparts sufficient force onto strand 31 to effect its severing. In the present illustrative embodiment of $\alpha_1$ is approximately 45°. This angle has been found to be optimum for cutting the steel center strand 31. This relatively blunt angle provides sufficient surface area engagable with core 31 to effect the severing thereof without damage to the blade.

This is in distinction to the cross-sectional shape of the outer portion 49 of the spiral forming cutting edge 42 which is shown in FIG. 5. The cutting surface thereat also has a straight back wall 54 and an angularly disposed cutting wall 56 meets generally at an apex 57, defining the cutting edge 42 thereat. However, the angle $\alpha_2$ defined between back wall 54 and cutting wall 56 which is much smaller than the angle $\alpha_1$ described above. A preferred angle is about 20°. This sharper, smaller angle provides a more knife-like configuration thereat which facilitates the slicing of the softer outer configuration 33 of cable 30.

Referring again to FIGS. 7 and 8, in the initial cutting position shown in FIG. 7, the outer portion 49 of the spiral forming the cutting edges 42 engages the outer configuration of cable 30. Cutting thereat is effected by the portion of cutting edge 42 having a blade angle of $\alpha_1$. Cutting of center strand 31 is effected by the portion of cutting edge 42 having a blade angle of $\alpha_2$.

It may be appreciated that the blades 20 and 22 are constructed so that the appropriately angled cutting edges engage the corresponding portion of the cable during the cutting cycle. By configuring blades 20 and 22 to having appropriately selected cutting blade angles, the present invention permits the cutting of cable such as ACSR with significantly less manual force than would be required with prior art blade construction.

Thus, an overall increase in effectiveness of the tool 10 of the present invention is achieved. Tool 10, by permitting cutting of cables using less manual force allows the tool to be constructed with smaller handles as less leverage is needed. In fact, one-hand operation is achieved for cable configuration that previously required two-handed operation. This significantly increases the use and applicability of the tool of the present invention. Further, as less force is necessary, the tool sees less stress. Tool components are less likely to fatigue over time thereby resulting in longer cycle life.

Figure 18:
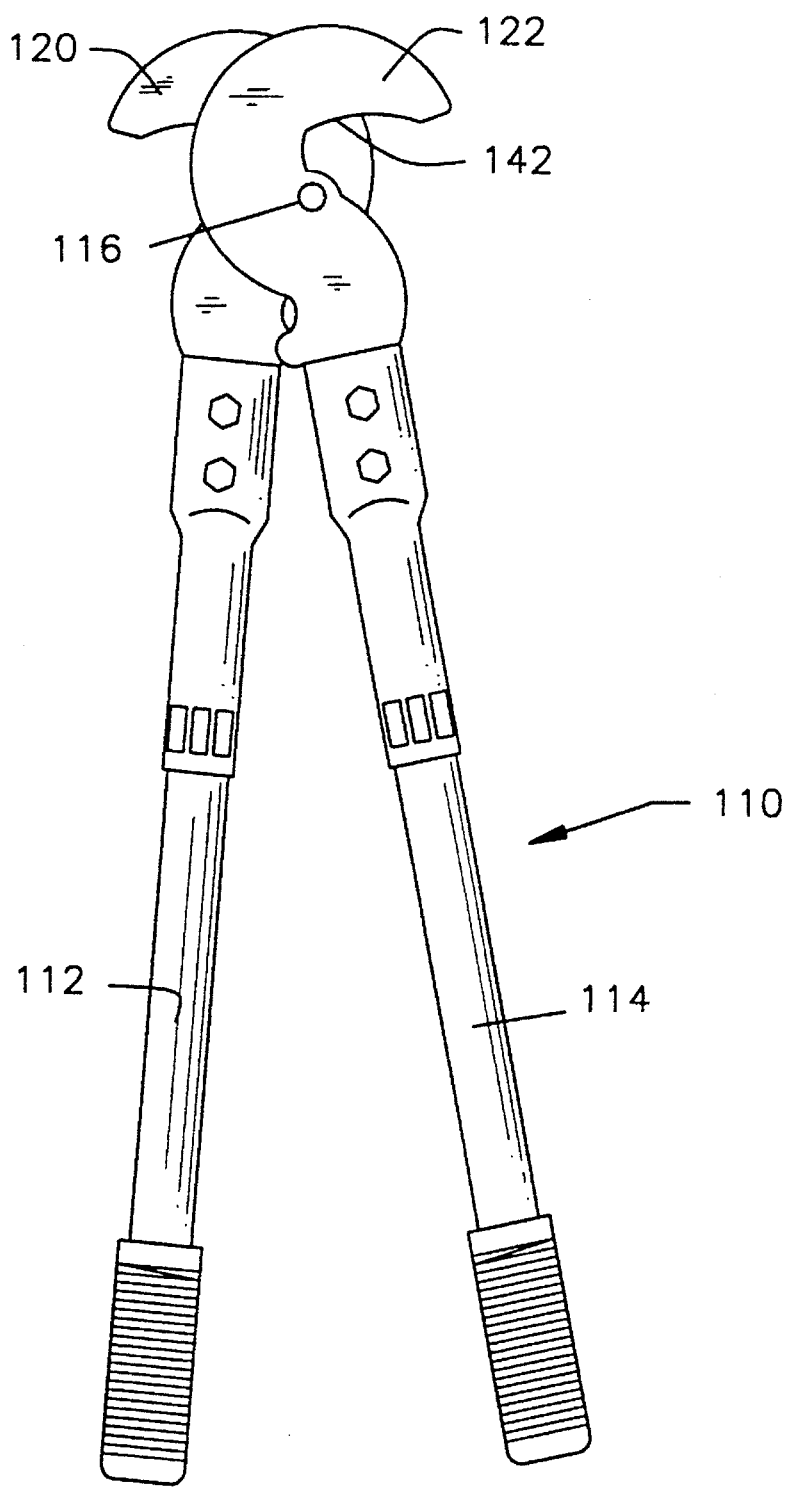
FIGS. 18–21 are front elevational showings of further embodiments of the cable cutting tool of the present invention.

In the preferred embodiment of the present invention, tool 10 takes the particular shape shown in FIGS. 2–4. However, the present invention is not limited to this shape. It is contemplated that the blade configuration of the present invention may be employed in combination with a scissor-type hand cutting tool such as that shown in FIG. 18.

Tool 110 includes a pair of handles 112 and 114 pivotally connected at a pivot bolt 116. A pair of curved cutting blade members 120 and 122 are attached to handles 112 and 114 at the upper ends thereof. Blades 120 and 122 are of construction similar to blades 20 and 22 described above. The spiral forming the cutting edge 142 of blades 120 and 122 spirals inwardly toward pivot bolt 116. Manual operation of handles 112 and 114 causes scissor-type cutting movement of blade members 120 and 122 to effect severing of a cable therebetween. The configuration of the blades 120 and 122, as above described, permits the severing of cable, especially ACSR, in a manner substantially similar to that described above.

Thus, it may be appreciated that the blade construction of the present invention may be employed advantageously to sever cable in a conventional scissor-type cutting tool 110. The construction of blade members 120 and 112 allows initial cutting over minimal arc-length extent of the cable and cutting of the center of the cable nearer to the pivot connection at pivot bolt 116. This reduces the manual force necessary to effect the cutting of the cable.

Figure 21:
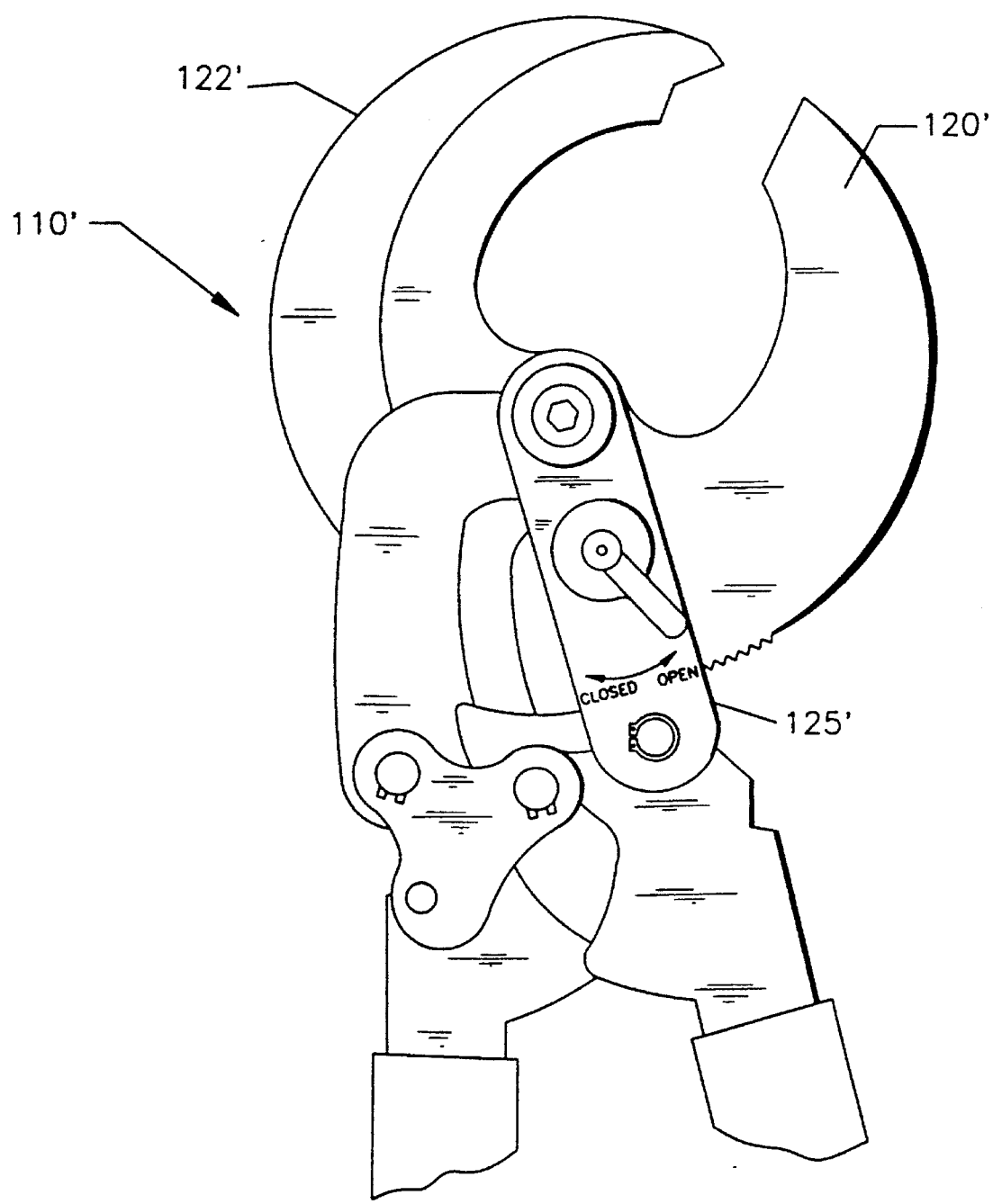

It is further contemplated that a tool 110' such as that shown in FIG. 21 may be constructed with an appropriate ratchet mechanism 125' of a type similar to that referenced above, for severing larger cable such as 1000 MCM cables or larger. Tool 110' would include opposed spiral blades 120' and 122' which would sever a cable in a manner described above.

Figure 19:
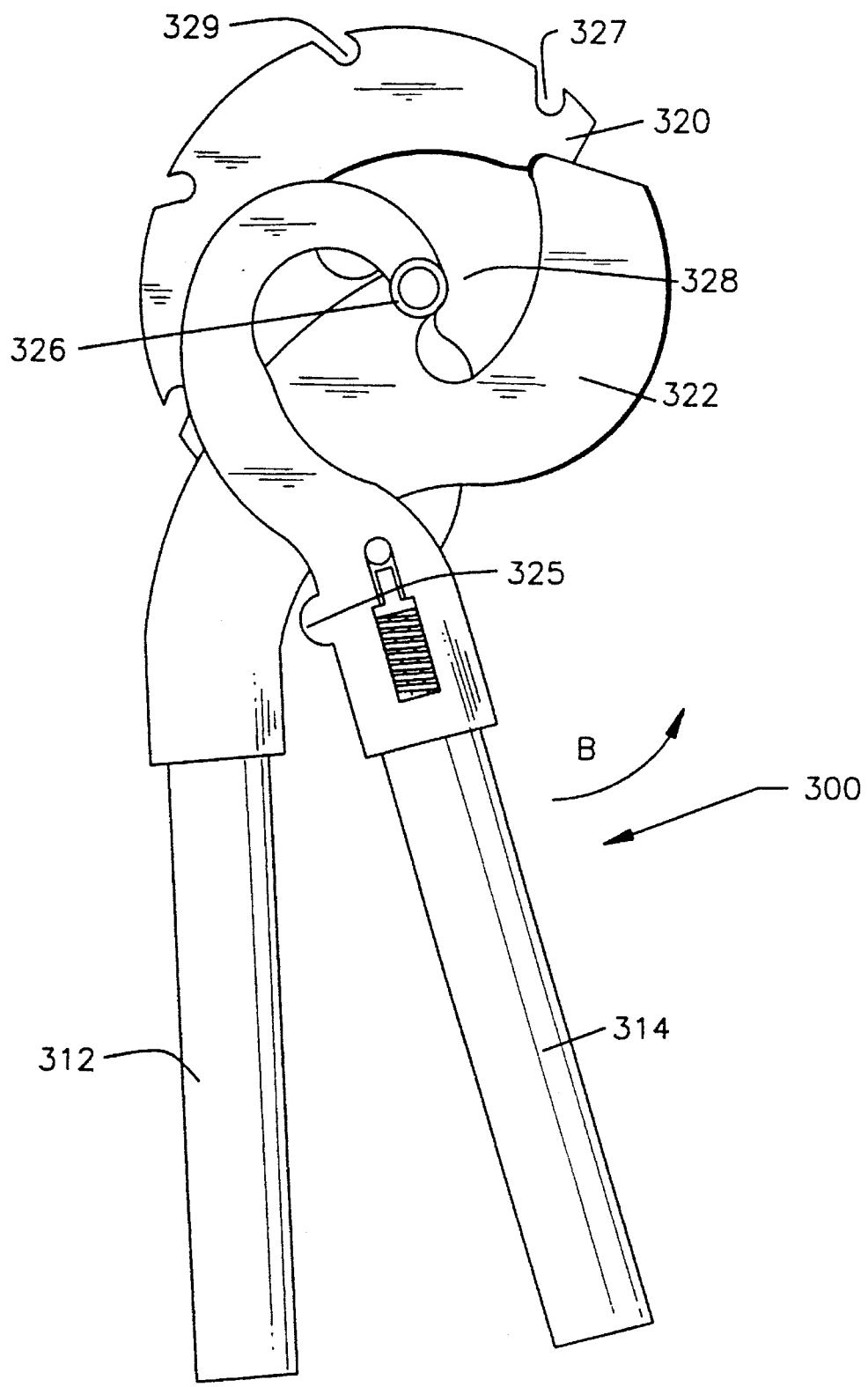
Figure 20:
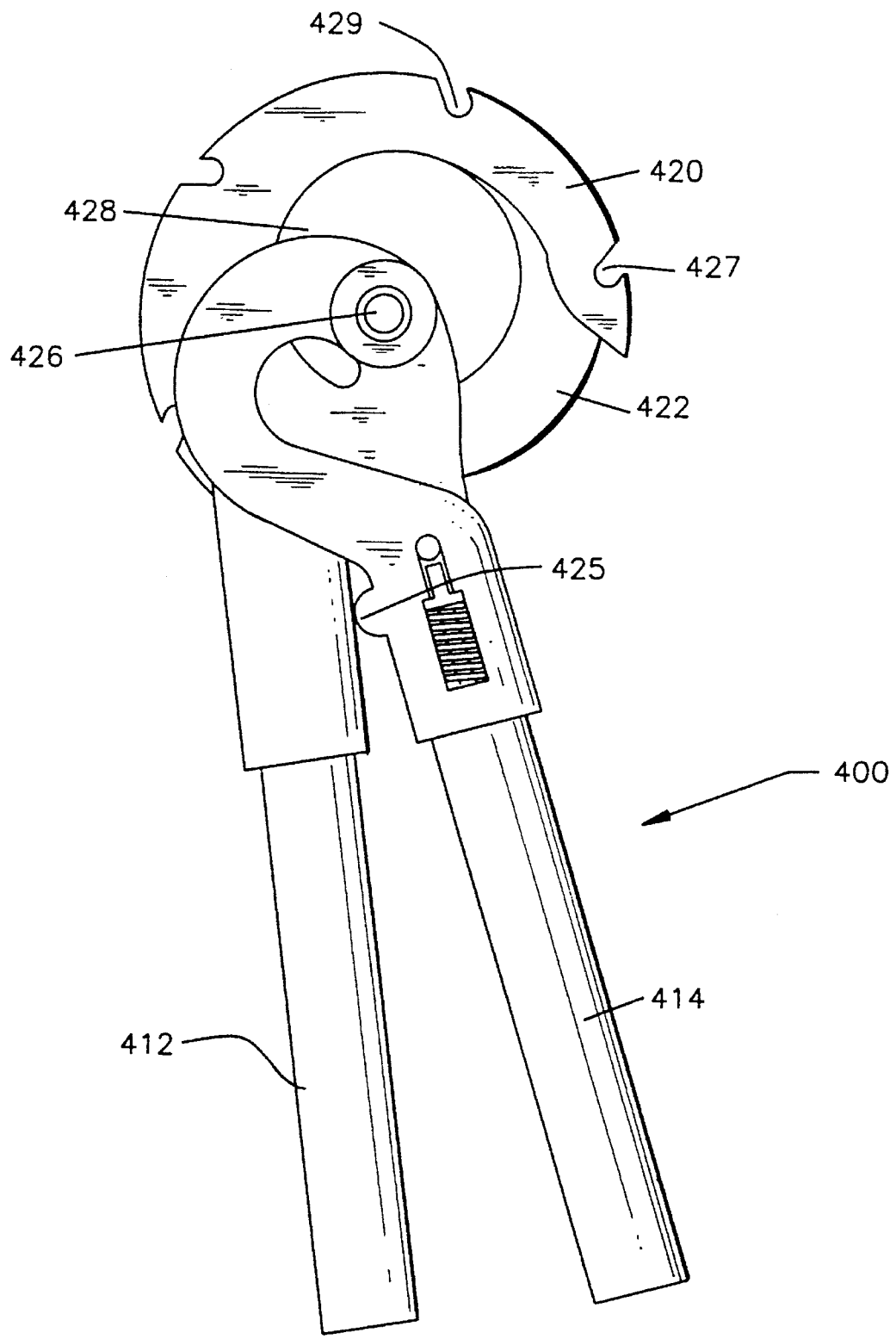

Still further embodiments of the present invention are shown in FIGS. 19 and 20. The blade design shown above with respect to FIGS. 11–17 may be employed in a manual cutting tool.

As shown in FIG. 19 a tool 300 employs a pair of handles 312 and 314. Handle 312 is generally a stationary handle and is attached to blade 322. In this embodiment, blade 322 need not be of the specific spiral configuration described above and may be of more conventional construction. Handle 314 is pivotally supported to blade 322 at pivot 326 for movement therearound. A spiral blade 320 is supported by pivot 326 for movement with respect to blade 322 under the actuation of moveable handle 314.

The tool 300 is operable by movement of handle 314 in the direction of arrow B. Upon such movement, protrusion 325 is insertable into a groove 327 in blade 320. Movement of handle 314 in a direction opposite arrow B effects movement of blade 320 about pivot 326 so as to cut a cable (not shown) within nest 328 defined between blades 320 and 322. Handle 314 can then be released from blade 320 and moved in the direction of arrow B to engage the next groove 329 in blade 320. Continuous operation in this manner effects cable cutting.

FIG. 20 shows a still further embodiment of the present invention. Tool 410 is substantially similar to and operates in a manner like tool 300 of FIG. 19. Tool 410 includes a pair of blades 420 and 422, each formed in a spiral configuration. Blade 422 is fixed to handle 412 while blade 420 is pivotally movable about pivot 426 under the operable movement of handle 414. Tool 410 further included nest 428 between blades 420 and 422, protrusion 425 and grooves 427 and 429. The cutting action of blades 420 and 422 is similar to that described above with respect to FIGS. 11–17.

Various changes to the foregoing described and shown structures would now be evident to those skilled in the art. Accordingly, the particularly disclosed scope of the invention is set forth in the following claims.

What is claimed is:

1. A tool for cutting elongate cable having an inner circular core and an outer circular configuration surrounding said core, said core being formed of material having a hardness greater than the material of said outer configuration, said tool comprising:

a pair of opposed cutting blades pivotally connected at a pivot, said opposed blades defining an opening for accommodating said cable;

said cutting blades each having facing spirally curved cutting edges, said curved cutting edges spiralling inwardly towards said pivot;

each said cutting edge having an outer spiral portion for engagement with the outer configuration of said cable at two spaced locations and an inner spiral portion for engagement with said core of said cable at a location next adjacent said pivot.

2. A tool of claim 1 wherein each said cutting blade includes side walls which converge at an angle forming said cutting edge.

3. A tool of claim 2 wherein said converging angle of said side walls differ as between said outer spiral portion and said inner spiral portion.

4. A tool of claim 3 wherein said angle of convergence of said side walls at said inner spiral portion is greater than the angle of convergence of said side walls at said outer spiral portion.

5. A cutting tool for cutting of generally circular cable comprising:

a pair of cutting blades operably connected at a pivot for progressive pivotal movement towards one another to effect cutting of a cable held therebetween; and at least one of said cutting blades including an elongate cutting edge configured in the shape of a uniform spiral which spirals inwardly toward said pivot.

6. A cutting tool of claim 5 wherein said at least one blade includes an outer spiral portion and an inner spiral portion adjacent said pivot.

7. A cutting tool of claim 6 wherein said at least one cutting blade includes a pair of side walls converging at an angle defining said cutting edge.

8. A cutting tool of claim 7 wherein said angle of said converging side walls adjacent said inner spiral portion differs from said angle of said converging side walls adjacent said outer spiral portion.

9. A cutting tool of claim 8 wherein said side wall angle at said inner spiral portion is greater than the side wall angle at said outer spiral portion.

10. A cutting tool of claim 9 wherein said side wall angle at said inner spiral portion is approximately 45°.

11. A cutting tool of claim 9 wherein said side wall angle at said outer spiral portion is approximately 20°.

12. A cutting tool of claim 5 wherein said at least one blade is rotatably movable about said pivot toward said other blade to effect cutting of said cable.

13. A cutting tool of claim 12 wherein said tool further includes a ratchet mechanism for providing distinct incremental rotational movement of said at least one blade with respect to said other blade.

14. A cutting tool of claim 13 wherein each said incremental movement of said at least one blade effects cutting of distinct portions of said cable.

15. A cutting tool of claim 13 wherein said rotation of said at least one blade to effect said cutting of cable occurs over a rotational movement of greater than 150°.

16. A cutting tool of claim 5 wherein said pair of cutting blades each include opposed elongate cutting edges each configured in the shape of a uniform spiral which spirals inwardly towards said pivot.

17. A cutting tool of claim 16 wherein said cutting blades are rotatably movable with respect to one another about said pivot.

18. A cutting tool of claim 16 wherein said cutting blades are rotatably movable from a first position accommodating said cable therebetween to a second position fully cutting through said cable.

19. A cutting tool of claim 18 wherein said movement of said cutting blades from said first position and said second position is achieved in excess of 150° of relative rotation.

20. A cutting tool of claim 19 wherein said cutting blades are relatively rotatably moveable from said first position to said second position over plural equal increments.

21. A cutting tool of claim 20 wherein said blades are moveable between said first position and said second position under a uniform manual force.

22. A cutting tool for cutting a generally circular cable having an outer circumference comprising:

a pair of cutting blades connected at a pivot for pivotal movement towards one another and defining a cable receiving opening therebetween;

said cutting blades each having a curved cutting edge defined by an inner cutting edge adjacent said pivot and an outer cutting edge, said outer circumference of said circular cable being engagable with the outer cutting edge of said cutting blades;

said cutting blades being defined by a pair of converging side walls forming said cutting edge, the angle of convergence of said side walls being greater at said inner cutting edge than at said outer cutting edge.

23. A cutting tool of claim 22 wherein said curved cutting edge is in the shape of an inwardly directed spiral.

24. A cutting tool of claim 23 wherein said angle of convergence of said side walls at said inner cutting edge is approximately 45°.

25. A cutting tool of claim 23 wherein said angle of convergence of said side walls at said outer cutting edge is approximately 20°.

26. A cable cutting tool comprising:

a pair of cutting blades having facing cutting edges, said cutting blades being connected at a pivot and defining therebetween a cable receiving nest;

said blades being relatively movable towards one another to reduce the size of the nest to sever a cable held within the nest;

at least one of said cutting blades having said cutting edge formed in a uniform spiral where the vector length of each point of the spiral as measured from a location adjacent said pivot is proportional to the angle subtended by each point of the spiral about said location.

27. A cable cutting tool of claim 26 wherein each of said cutting blades includes said cutting edges formed in said uniform spiral.

* * * * *